(12) United States Patent
Maruo et al.

(10) Patent No.: US 7,146,007 B1
(45) Date of Patent: *Dec. 5, 2006

(54) SECURE CONDITIONAL ACCESS PORT INTERFACE

(75) Inventors: Jun Maruo, Tokyo (JP); Atsushi Kagami, Tokyo (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,568

(22) Filed: Mar. 29, 2000

(51) Int. Cl.
- H04N 7/167 (2006.01)
- H04N 7/12 (2006.01)
- G06F 11/30 (2006.01)
- G06F 12/14 (2006.01)
- H04L 9/32 (2006.01)

(52) U.S. Cl. ............ 380/210; 380/200; 380/236; 713/189; 713/192; 726/30

(58) Field of Classification Search ............ 713/189, 713/192, 200; 380/200, 205, 207, 213, 236, 380/208, 210, 217; 348/384.1, 512; 710/101, 710/102, 103; 704/503, 504; 708/203, 208; 726/30

See application file for complete search history.

(56) References Cited

U.S. PATENT DOCUMENTS

| | | | |
|---|---|---|---|
| 5,485,221 A | 1/1996 | Banker et al. | 348/563 |
| 5,684,876 A | 11/1997 | Pinder et al. | 380/37 |
| 5,774,548 A | 6/1998 | Bando et al. | 380/9 |
| 5,787,171 A | 7/1998 | Kubota et al. | 380/20 |
| 5,818,935 A | 10/1998 | Maa | 380/20 |
| 5,825,879 A | 10/1998 | Davis | 380/5 |
| 5,828,416 A * | 10/1998 | Ryan | 348/512 |
| 5,828,419 A | 10/1998 | Bruette et al. | 348/563 |
| 5,850,218 A | 12/1998 | LaJoie et al. | 345/327 |
| 5,862,219 A | 1/1999 | Glaab | 380/20 |
| 5,883,621 A | 3/1999 | Iwamura | 345/327 |
| 5,892,910 A | 4/1999 | Safadi | 395/200.47 |
| 5,901,339 A | 5/1999 | Saito | 455/2 |
| 5,960,445 A | 9/1999 | Tamori et al. | 707/203 |

(Continued)

OTHER PUBLICATIONS

W.K. Gass, "System Integration Issues for Set-Top Box," Nov. 5, 1997, 1997 IEEE Workshop on Signal Processing Systems, 1997. SIPS 97—Design Implementation, pp. 65-75.*

(Continued)

Primary Examiner—Gilberto Barrón, Jr.
Assistant Examiner—Virgil Herring

(57) ABSTRACT

An apparatus and method thereof for providing a secure path for a digital signal in an intelligent transceiver such as a bi-directional set-top box. A digital signal (e.g., a broadcast signal or a signal received via a cable modem) is received by the intelligent transceiver at a front-end device (comprising, for example, a tuner). The digital signal is descrambled (if it is scrambled) and encrypted (if it is not encrypted) by a first functional block (e.g., an interface card or point of deployment) coupled to the front-end device. Coupled to the front-end device via the first functional block is a second functional block for processing (e.g., decoding) audio and/or visual content within the digital signal. Integrated into the second functional block is a decryption engine for decrypting encrypted signals. Signals from the front-end device are received via the first functional block by the decryption engine integral to the second functional block. There are no points between the first functional block and the decryption engine and between the decryption engine and the second functional block at which a descrambled and decrypted signal can be intercepted, thus providing a secure interface between the front-end device and the second functional block.

14 Claims, 10 Drawing Sheets

U.S. PATENT DOCUMENTS

| | | | | |
|---|---|---|---|---|
| 6,021,199 | A | 2/2000 | Ishibashi | 380/10 |
| 6,025,837 | A | 2/2000 | Matthews, III et al. | 345/327 |
| 6,040,851 | A | 3/2000 | Cheng et al. | 348/10 |
| 6,144,402 | A | 11/2000 | Norsworthy et al. | 348/13 |
| 6,154,206 | A * | 11/2000 | Ludtke | 713/168 |
| 6,185,735 | B1 | 2/2001 | Le Berre | 725/5 |
| 6,286,103 | B1 * | 9/2001 | Maillard et al. | 713/200 |
| 6,317,885 | B1 | 11/2001 | Fries | 725/109 |
| 6,374,404 | B1 | 4/2002 | Brotz et al. | 725/46 |
| 6,407,998 | B1 | 6/2002 | Polit et al. | 370/365 |
| 6,493,876 | B1 | 12/2002 | DeFreese et al. | 725/100 |
| 6,567,982 | B1 | 5/2003 | Howe et al. | 725/100 |
| 6,601,238 | B1 | 7/2003 | Morrison et al. | 725/50 |
| 6,628,891 | B1 * | 9/2003 | Vantalon et al. | 386/94 |
| 6,757,909 | B1 | 6/2004 | Maruo et al. | 725/111 |
| 2003/0149993 | A1 | 8/2003 | Son et al. | 725/132 |

OTHER PUBLICATIONS

Society of Cable Telecommunications Engineers, Inc., Engineering Committee, Digital Video Subcommittee, "Point-of-Deployment (POD) Module Interface Proposal", SCTE DVS 131 Rev. Apr. 13, 1999.

Advanced Television Systems Committee, "Program and System Information Protocol for Terrestrial Broadcast and Cable", ATSC Standard Doc. A/65, Dec. 23, 1997.

Society of Cable Telecommunications Engineers, Inc., Engineering Committee, Digital Video Subcommittee; "Point-of-Development (POD) Module Interface Proposal"; SCTE DVS 131 Rev. 8; Date of Original Issue Feb. 6, 1998; Date of Latest Revision Apr. 13, 1999.

Advanced Television Systems Committee; "Program and System Information Protocol for Terrestrial Broadcast and Cable"; Doc. A/65; Dec. 23, 1997.

Copy protection of the NRSS Conditional Access Interface White Paper (WP_NRSS.doc); Intel Corporation; Sony Corporation; Revision 1.0; Nov. 10, 1998; 17 pages.

"National Renewable Security Standard (NRSS) Part B"; Doc: NRS-99-04-A; Draft EIA-679-A Part B; proposed Revisions (679BrAv5.doc); J. Chaney; Samsung; C. Baggaett; MediaOne.

* cited by examiner

SECURE CONDITIONAL ACCESS PORT INTERFACE

RELATED UNITED STATES PATENT APPLICATIONS

This application is related to U.S. patent application Ser. No. 09/538,607 by J. Maruo et al., filed on Mar. 29, 2000, abandoned, entitled "Modular Conditional Access Block,"assigned to the assignee of the present invention, and hereby incorporated by reference in its entirety.

This application is related to U.S. patent application Ser. No. 09/538,605 by J. Maruo et al., filed on Mar. 29, 2000, abandoned, entitled "Method and Apparatus for a Modularized Bi-Directional Tuning System,"assigned to the assignee of the present invention, and hereby incorporated by reference in its entirety.

BACKGROUND OF THE INVENTION

1. Field of the Invention

The present invention relates to the field of intelligent transceivers such as bi-directional set-top boxes. More specifically, the present invention pertains to an apparatus and method thereof for maintaining a secure interface between the front-end of an intelligent transceiver and a downstream functional block in the intelligent transceiver.

2. Background Art

Digital broadcast systems include direct broadcast digital satellite systems, interactive World Wide Web ("Web") access systems, and digital cable systems. Digital broadcasting provides a number of advantages to subscribers, such as variety and flexibility of programming, useful and comprehensive support services (such as detailed electronic programming guides), and superior audio and video quality.

The Conditional Access (CA) function of a digital broadcast system allows selective access, for a fee, to premium services such as pay-per-view movies and events. The producers of the movies, events, etc., require that access to the premium services be controlled in order to protect their commercial interests as well as to enforce copyrights and protect copyright ownership. The digital broadcast system operators (also referred to as Multiple System Operators, MSOs) also have a commercial interest in limiting access to these premium services to authorized users only.

Subscribers receive digital broadcasts (including satellite, cable and Web broadcasts) via set-top boxes or other similar consumer electronic equipment located in the subscriber's home. With a bi-directional set-top box, in addition to receiving broadcasts, a subscriber can transmit messages to the MSO. Using the bi-directional set-top box (generally, a "transceiver" or "intelligent transceiver"), the subscriber selects a premium service, and the subscriber's selection as well as information needed for billing purposes is transmitted to the MSO. In a common implementation, a "smart card" stores the information needed for billing, and on a periodic basis (perhaps once per month) an automatic connection is made between the transceiver and the MSO so that the billing information can be transmitted to the MSO.

Digital broadcast content is vulnerable to unauthorized use and duplication ("pirating") while it is being broadcast, or after it has been received and is being processed. For example, during broadcast, the signal could be intercepted and displayed (or duplicated and rebroadcast) using a transceiver not provided by the MSO. On the other hand, even when a transceiver provided by the MSO is used, the signal could be diverted within the transceiver so that the smart card is bypassed. In either case, copyrights are circumvented. In addition, the MSO is unaware of the unauthorized use and so does not have the information needed to collect the fees it is owed.

To prevent unauthorized use, MSOs typically broadcast a scrambled signal. The signal is descrambled in the transceiver using a key provided by the MSO in the smart card. Once descrambled, the signal is encrypted in the transceiver. However, even when such security measures are employed in an attempt to prevent pirating, sophisticated methods are available to circumvent them.

Prior Art FIG. 1 is a block diagram showing some of the elements in one embodiment of a prior art transceiver (e.g., a set-top box) (for clarity, not all of the elements of the set-top box are shown). Front-end unit 20 of the set-top box comprises a tuner (not shown), as well as other devices known in the art, for receiving a digital broadcast signal 90. Coupled to front-end unit 20 is point of deployment (POD) 10. POD 10 typically is adapted to receive a smart card (not shown) that, as described above, can be used to provide billing information to the MSO. The smart card also typically contains a key provided by the MSO that is used to descramble digital broadcast signal 90. POD 10 includes a descrambling/encryption unit 40 that uses the key provided by the MSO to descramble broadcast signal 90 (if the signal is scrambled). Descrambling/encryption unit 40 also encrypts the signal (if the signal is not encrypted). It is appreciated that, in other prior art embodiments, descrambling/encryption unit 40 may consist of separate elements, one for descrambling and one for encryption.

Front-end unit 20 also includes decryption unit 50 for decrypting an encrypted broadcast signal before the signal is sent to audio/visual (A/V) decoder 30. A/V decoder 30 is used for demultiplexing the signal and for decoding, for example, MPEG (Moving Picture Experts Group) video signals and/or Dolby AC3 audio signals.

Thus, in this prior art embodiment, digital broadcast signal 90 is received by the set-top box at front-end unit 20 and forwarded to POD 10. Broadcast signal 90 is descrambled by descrambling/encryption unit 40. Once descrambled, broadcast signal 90 is encrypted to prevent unauthorized duplication. Further downstream in the set-top box, broadcast signal 90 is decrypted using decryption unit 50 so that it can be decoded (e.g., MPEG or AC3 decoding) in A/V decoder 30, and subsequently processed so that it can be viewed and/or listened to by an authorized subscriber.

A problem with this prior art embodiment is that, between decryption unit 50 and A/V decoder 30, broadcast signal 90 is transmitted in the clear at point 12 (that is, it is not scrambled nor is it encrypted at this point). Thus, at point 12, broadcast signal 90 can be intercepted and duplicated. As a digital signal, it is possible to make near perfect copies which can be readily distributed to unauthorized parties (e.g., rebroadcast via the Internet, copied onto a compact disk, etc.). While the MSO may receive payment for a one-time use, subsequent use by unauthorized users is made without proper compensation to the MSO or the copyright owners.

Prior Art FIG. 2 illustrates some of the elements in another embodiment of a prior art set-top box (for clarity, not all of the elements are shown). Front-end unit 120, descrambling/encryption unit 140, POD 110, decryption unit 150, and A/V decoder 130 each function in a manner as described above in conjunction with FIG. 1. In this embodiment, decryption unit 150 is moved out of front-end unit 120 and closer to A/V decoder 130. Even so, there still remains a point 14 at which broadcast signal 190 is transmitted in the clear and can be intercepted by an unauthorized user.

Thus, the prior art is problematic because the descrambled and decrypted signal that is output from the decryption unit may be intercepted and pirated by an unauthorized user between the front-end device and the functional block (e.g., the A/V decoder).

SUMMARY OF THE INVENTION

Accordingly, what is needed is an apparatus and/or method that can prevent pirating of a descrambled and decrypted digital signal between a front-end device and a subsequent functional block (e.g., an audio/video decoding block). What is also needed is an apparatus and/or method that can address the above need and that can be implemented in a transceiver (e.g., a set-top box) used in a digital broadcast system.

The present invention includes an apparatus and method thereof that satisfy the above needs. These and other advantages of the present invention not specifically mentioned above will become clear within discussions of the present invention presented herein.

The present invention pertains to an apparatus and method thereof for providing a secure path for a digital signal in, for example, an intelligent transceiver such as a bi-directional set-top box. In the present embodiment, the present invention comprises an integrated circuit device with a functional block and a decryption engine integrated therein. The integrated circuit device (specifically, the decryption engine) receives an encrypted digital signal. The decryption engine is configured to decrypt the encrypted digital signal and to supply the decrypted digital signal to the functional block. There is not a point between the decryption engine and the functional block at which the digital signal is in the clear (e.g., descrambled and decrypted) and is externally accessible, thereby providing a physically secure interface between the integrated circuit device and the functional block.

In one embodiment, a digital signal is received by an intelligent transceiver at a front-end device (comprising, for example, a tuner). The digital signal is descrambled (if it is scrambled) and encrypted (if it is not encrypted) by a first functional block (e.g., an interface card or point of deployment) coupled to the front-end device. Coupled to the front-end device via the first functional block is a second functional block used for processing (e.g., decoding) audio and/or visual (A/V) content within the digital signal. Integrated into the second functional block is a decryption engine used for decrypting encrypted signals. Digital signals from the front-end device are received via the interface card (or point of deployment) by the decryption engine integral to the A/V decode block. There are no points between the interface card (point of deployment) and the decryption engine nor between the decryption engine and the A/V decode block at which a descrambled and decrypted signal can be intercepted, thus providing a secure interface between the front-end device and the A/V decode block.

In one embodiment, the digital signal is an audio/visual media signal delivered to the intelligent transceiver using, for example, a terrestrial line (e.g., a cable system), the World Wide Web (e.g., a connection to the Internet), or a wireless transmission (e.g., a satellite broadcast).

In one embodiment, the encrypted signal is encrypted using an encryption routine compliant with the Data Encryption Standard Electronic Code Book (DES ECB).

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

PRIOR ART

DETAILED DESCRIPTION OF THE INVENTION

Figure 1:
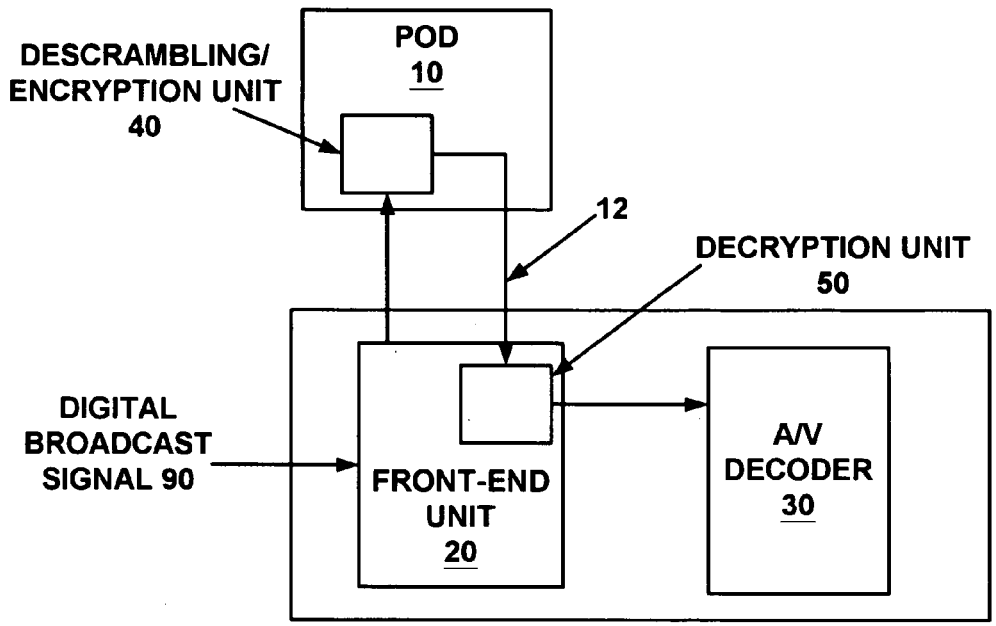
FIG. 1 is a block diagram showing one embodiment of a prior art set-top box.
Figure 2:
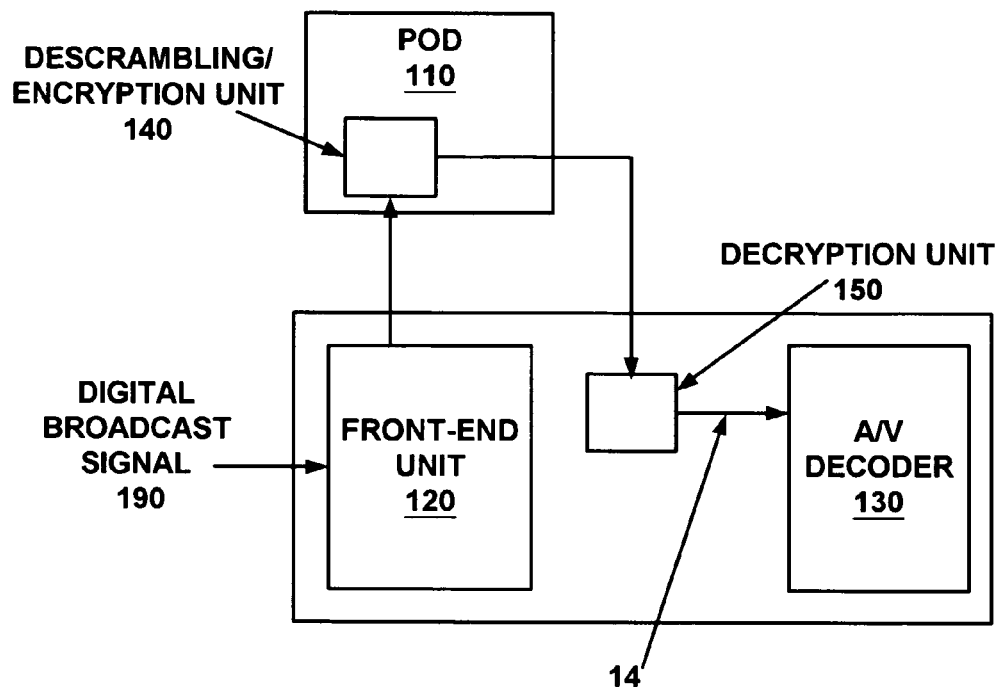
FIG. 2 is a block diagram showing another embodiment of a prior art set-top box.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an intelligent electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "encrypting" or "decrypting" or "descrambling" or "decoding" or the like, refer to the action and processes (e.g., process 500 of FIG. 5) of an electronic device such as a microcontroller or similar electronic computing device (e.g., dedicated or embedded computer system) that manipulates and transforms data. The data are represented as physical (electronic) quantities within the electronic device's registers and memories and is transformed into other data similarly represented as physical quantities within the electronic device memories or registers or other such information storage, transmission, or display screens.

The present invention is described in the context of an intelligent transceiver (e.g., a set-top box) that can be used as part of a digital broadcast system. However, it is appreciated that the present invention may be utilized in other types of devices including consumer electronic devices where it may be necessary to decrypt and encrypt a digital signal.

Figure 3A:
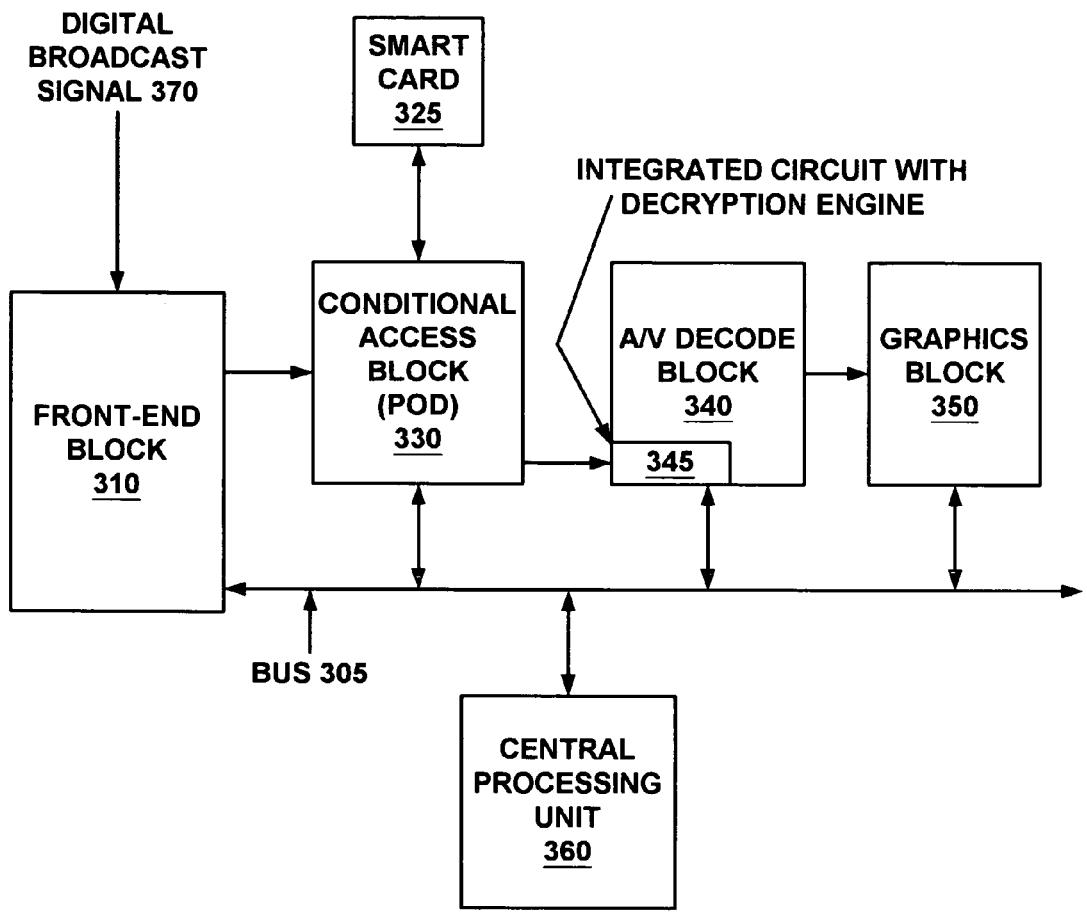
FIG. 3A is a block diagram of one embodiment of an intelligent transceiver upon which embodiments of the present invention may be practiced.

FIG. 3A is a block diagram of one embodiment of an intelligent transceiver 300 (e.g., a set-top box) upon which embodiments of the present invention may be practiced. Intelligent transceiver 300 receives digital broadcast signal 370 from a digital broadcaster (not shown). Digital broadcast signal 370 is a media signal comprising audio and video content. Digital broadcast signal 370 can be delivered to intelligent transceiver 300 using any of the various mechanisms currently in use or envisioned, such as a terrestrial line (e.g., a cable system), the World Wide Web (e.g., a connection to the Internet), or a wireless transmission (e.g., a satellite broadcast). In accordance with the present invention, a number of different digital broadcast signal formats in use or envisioned can be used, such as the Advanced Television Systems Committee (ATSC) digital television format.

In the present embodiment, intelligent transceiver 300 includes front-end block 310 coupled to bus 305, conditional access block 330 coupled to front-end block 310 and bus 305, audio/video (A/V) decode block 340 coupled to conditional access block 330 and bus 305, graphics block 350 coupled to A/V decode block 340 and bus 305, and central processing unit 360 coupled to bus 305. Conditional access block 330, also referred to as a point of deployment (POD) or an interface card, is adapted to receive smart card 325.

Bus 305 is an internal address/data bus for communicating digital information between the functional blocks of intelligent transceiver 300. In the present embodiment, front-end block 310 contains one or more tuners for receiving digital broadcast signal 370. For example, in one embodiment, front-end block 310 can contain a tuner for receiving a wireless transmission (e.g., a satellite broadcast) and another tuner for receiving a cable transmission. Front-end block 310 can also include a device (e.g., a modem) that allows a telephone or digital subscriber line (DSL) connection to be made to the World Wide Web so that a broadcast signal can be received via the Internet.

In the present embodiment, central processing unit 360 contains a processor (not shown) for processing information and instructions. Central processing unit 360 also may contain random access memory, read only; memory, one or more caches, a flash memory and the like (not shown) for storing information and instructions.

Smart card 325 stores information needed by a cable system operator or digital broadcast system operator (e.g., a Multiple System Operator, MSO) in order to bill a subscriber for services used by the subscriber (for example, the viewing of a pay-per-view movie or event). Typically, smart card 325 also includes a key that is used to descramble digital broadcast signal 370 (if the signal is scrambled). In the present embodiment, smart card 325 is inserted into conditional access block 330; however, it is appreciated that in other embodiments smart card 325 may be coupled in a different manner to intelligent transceiver 300 (for example, it may be inserted into either front-end block 310 or A/V decode block 340). Using the key from smart card 325, conditional access block 330 descrambles digital broadcast signal 370.

Because digital broadcast signal 370 has been descrambled, the signal must be encrypted in order to prevent its unauthorized use and duplication. In the present embodiment, conditional access block 330 contains an encryption engine (not shown) that encrypts digital broadcast signal 370. In one embodiment, the encryption engine uses a well-known DES ECB (Data Encryption Standard Electronic Code Book) encryption routine and a key length of 56 bits. However, it is appreciated that other well-known and commercially available encryption routines and different key lengths may be used in accordance with the present invention. It is further appreciated the encryption engine may be incorporated elsewhere in intelligent transceiver 300, such as in front-end block 310.

In accordance with the present invention, A/V decode block 340 is an integrated circuit device comprising a functional block and a decryption engine 345 integrated therein. Decryption engine 345 is integral with A/V decode block 340 (that is, as a single integrated circuit, or "chip") and coupled to front-end block 310 via conditional access block 330. In the present embodiment, the link between conditional access block 330 and A/V decode block 340 (specifically, decryption engine 345) is separate from bus 305; that is, there is a direct connection between conditional access block 330 and decryption engine 345 that bypasses bus 305.

Decryption engine 345 decrypts an encrypted signal (e.g., digital broadcast signal 370) received by A/V decode block 340. The output of decryption engine 345 is a decrypted digital signal that is "in the clear." The signal in the clear is transmitted within A/V decode block 340 for decoding. The signal in the clear is never transmitted outside the physical block comprising A/V decode block 340 and decryption engine 345.

Thus, there is not a point for intercepting a signal that is in the clear (e.g., a decrypted and descrambled signal) between conditional access block 330 and decryption engine 345, nor is there a point between decryption engine 345 and A/V decode block 340 where an in-the-clear signal can be externally accessed and intercepted. Therefore, the present invention provides a secure interface between conditional access block 330 and decryption engine 345 and also between decryption engine 345 and A/V decode block 340, and thus between front-end block 310 and A/V decode block 340. As such, the present invention can prevent pirating of a descrambled and decrypted digital signal.

In the present embodiment, A/V decode block 340 receives encrypted digital broadcast signal 370 from conditional access block 330, decrypts the signal using decryption engine 345, and decodes the video content and the audio content of digital broadcast signal 370. In the present embodiment, an MPEG (Moving Pictures Experts Group) video decoder and an AC3 (Digital Dolby) audio decoder are used; however, it is appreciated that other video or audio decoders can be used in accordance with the present invention. In addition, in one embodiment, A/V decode block 340 is capable of handling video and audio analog signals.

The inputs to graphics block 350 are the decoded video and audio digital signals from A/V decode block 340. In one embodiment, graphics block 350 also receives external audio and video analog inputs. Graphics block 350 processes the audio and video information and provides the output to, for example, a television set or a computer system (not shown) where it can be viewed and listened to.

Figure 3B:
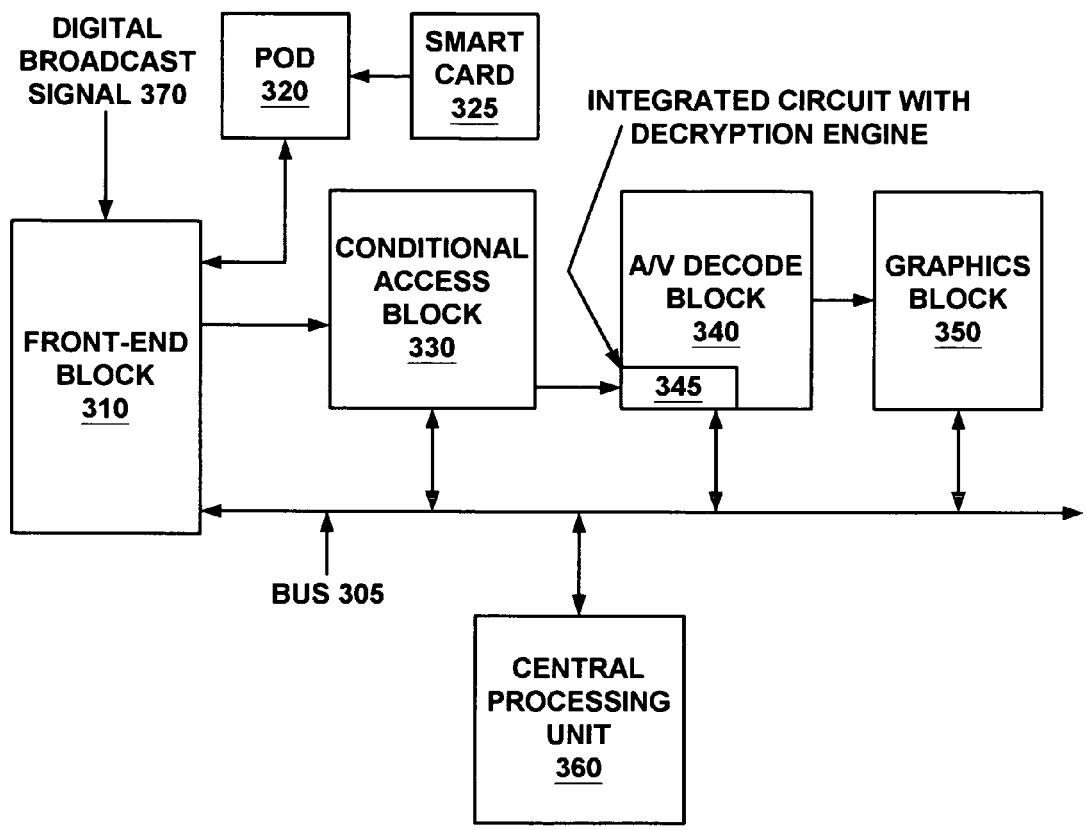
FIG. 3B is a block diagram of another embodiment of an intelligent transceiver upon which embodiments of the present invention may be practiced.

FIG. 3B is a block diagram of another embodiment of intelligent transceiver 300 upon which embodiments of the present invention may be practiced. In this embodiment, point of deployment (POD) 320 is separate from conditional access block 330, and smart card 325 is plugged into POD 320 instead of conditional access block 330. Smart card 325 contains a key for descrambling digital broadcast signal 370, and this key is used by POD 320 to descramble digital broadcast signal 370. POD 320 also encrypts digital broadcast signal 370 using an encryption engine (not shown). Although POD 320 is separate from conditional access block 330 in this embodiment, conditional access block 330 can still exist in intelligent transceiver 300.

Figure 3C:
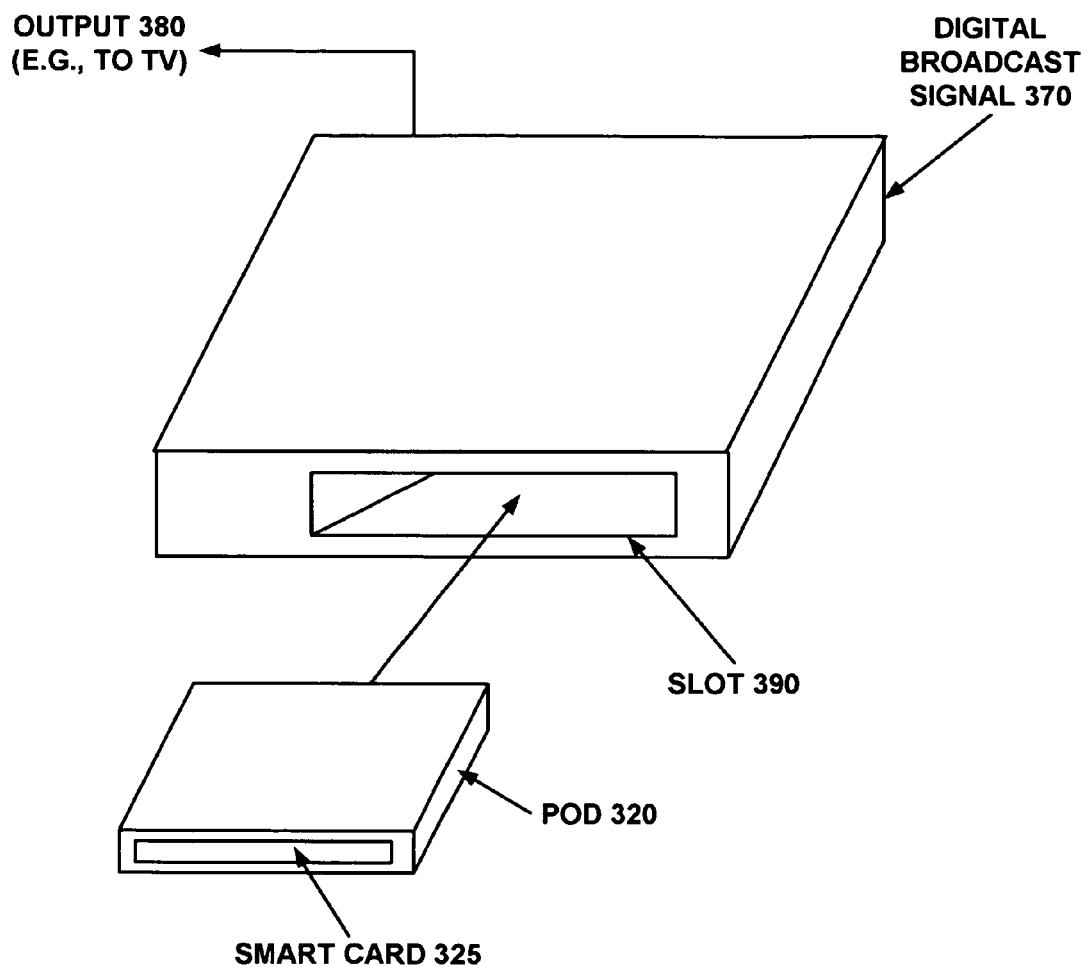
FIG. 3C is a perspective illustration of one embodiment of an intelligent transceiver upon which embodiments of the present invention may be practiced.

FIG. 3C is an illustration of the embodiment of intelligent transceiver 300 of FIG. 3B, upon which embodiments of the present invention may be practiced. In this embodiment, smart card 325 is inserted into POD 320, which is inserted into slot 390. Digital broadcast signal 370 is received by intelligent transceiver 300 and forwarded to POD 320, where it is descrambled and encrypted using a key provided by smart card 325. Subsequently, the digital signal is decrypted and the audio and visual content are decoded and processed by intelligent transceiver 300 as described above, and the result (output 380) is sent to, for example, a television (not shown) or similar device.

Figure 3D:
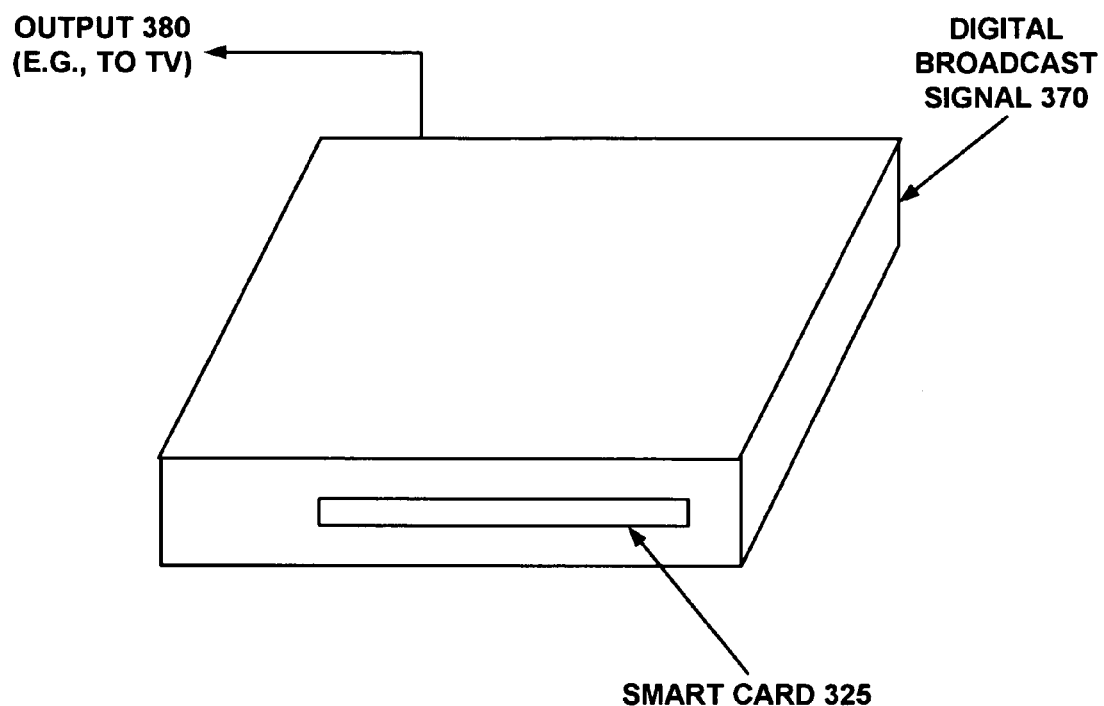
FIG. 3D is a perspective illustration of another embodiment of an intelligent transceiver upon which embodiments of the present invention may be practiced.

FIG. 3D is an illustration of the embodiment of intelligent transceiver 300 of FIG. 3A, upon which embodiments of the present invention may be practiced. In this embodiment, smart card 325 is inserted into an interface card (e.g., conditional access block 330 of FIG. 3A) which is built into intelligent transceiver 300. Digital broadcast signal 370 is received by intelligent transceiver 300 and forwarded to conditional access block 330, where it is descrambled and encrypted using a key provided by smart card 325. Subsequently, the digital signal is decrypted and the audio and visual content are decoded and processed by intelligent transceiver 300 as described above, and the result (output 380) is sent to, for example, a television (not shown) or similar device.

Figure 4A:
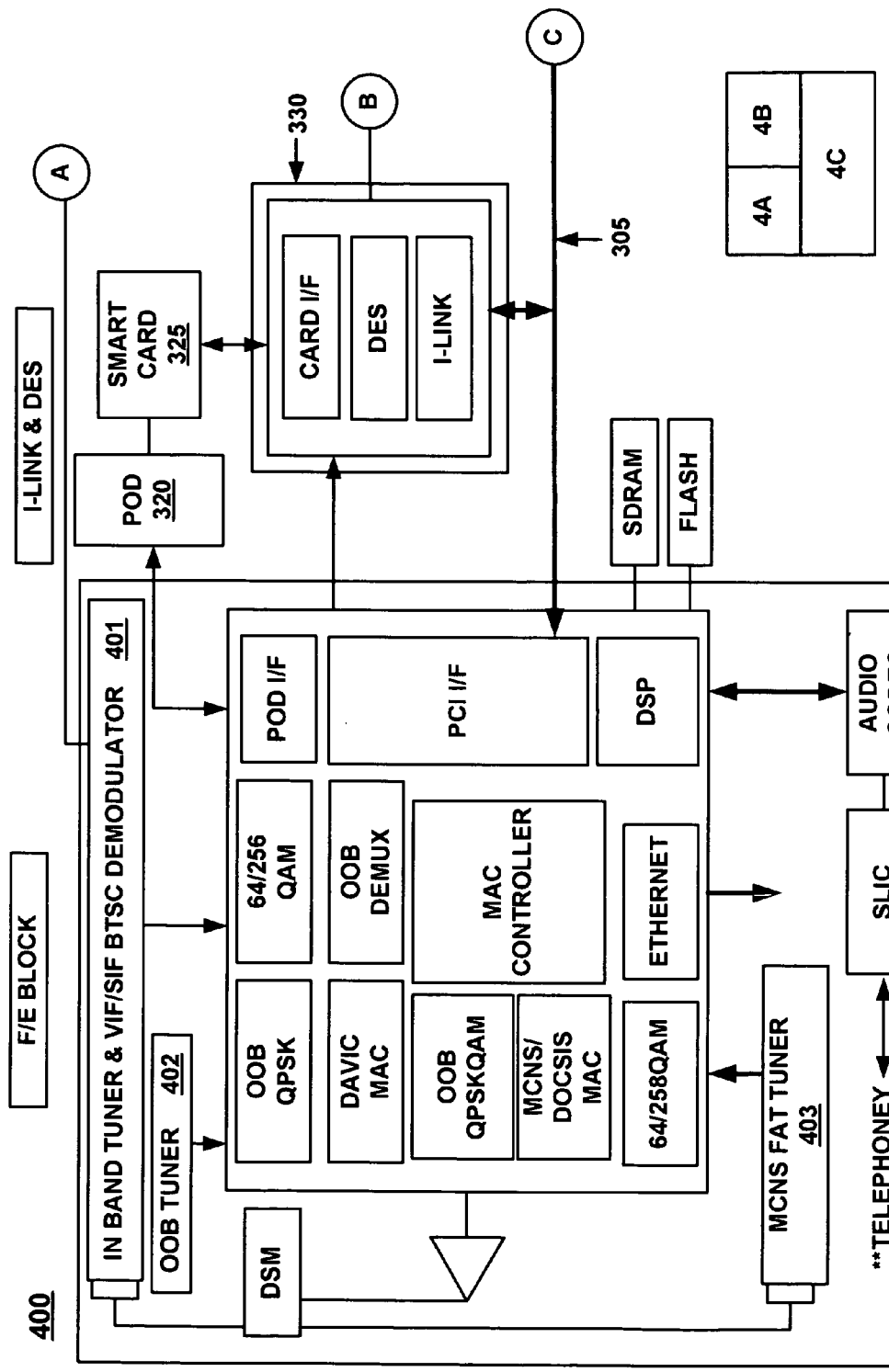
FIGS. 4A, 4B and 4C are block diagrams of one embodiment of an intelligent transceiver in accordance with the present invention.
Figure 4B:
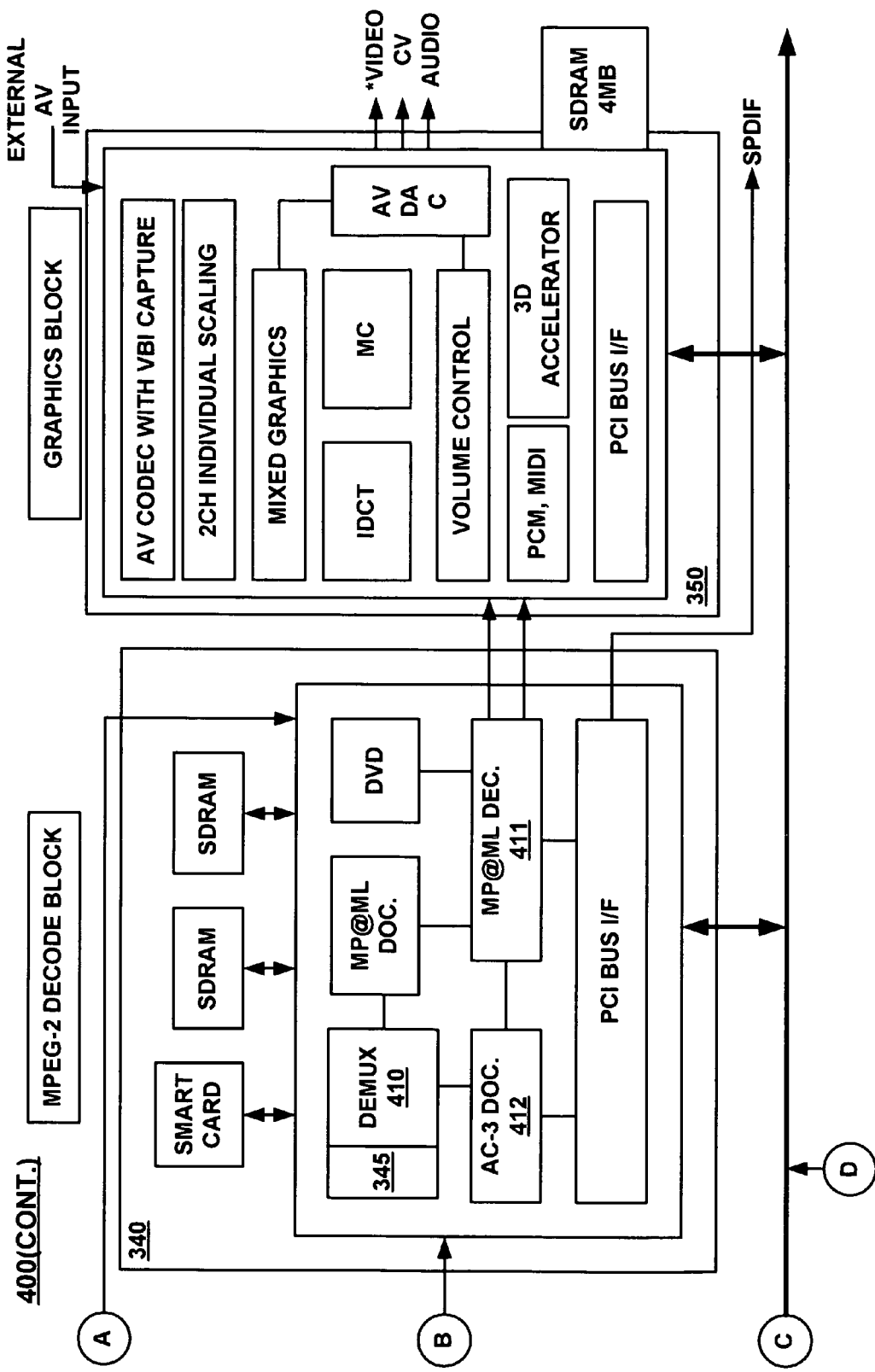
Figure 4C:
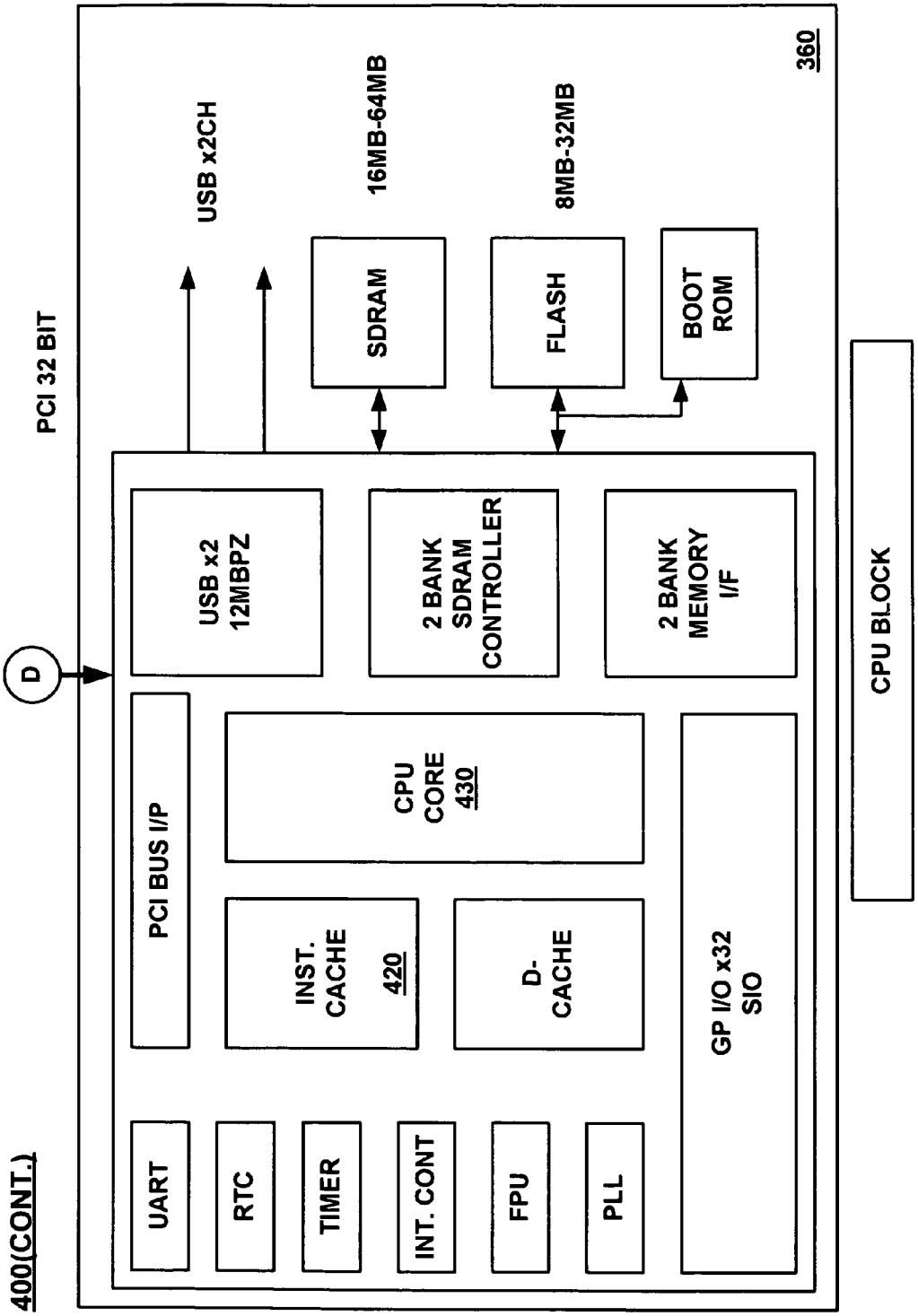

FIGS. 4A, 4B and 4C are block diagrams of an intelligent transceiver 400 (e.g., a bi-directional set-top box) showing additional details of the embodiments illustrated by FIGS. 3A and 3B. Table 1 is a list of the various elements and acronyms contained in FIGS. 4A, 4B and 4C.

Elements and Acronyms of Intelligent Transceiver Embodied in FIGS. 4A, 4B and 4C

TABLE 1

Elements and Acronyms of Intelligent Transceiver Embodied in FIG. 4

| | |
|---|---|
| AVDAC | Audio Video Digital-to-Analog Converter |
| BTSC | Broadcast Television Systems Committee |
| D-Cache | Data Cache |
| DAVIC | Digital Audio Visual Council |
| DOCSIS | Data Over Cable Service Interface Specification |
| DSM | Diplexer, Splitter Module |
| DSP | Digital Signal Processor |
| DVD | Digital Video Disk |
| FAT | Forward Application Tuner |
| FPU | Floating Point Unit |

TABLE 1-continued

Elements and Acronyms of Intelligent Transceiver Embodied in FIG. 4

| | |
|---|---|
| I/F | Interface |
| IDCT | Inverse Discrete Cosine Transform |
| Inst. Cache | Instruction Cache |
| Int. Cont. | Interrupt Controller |
| MAC | Media Access Control |
| MC | Motion Compensation |
| MCNS | Multiple Cable Network System |
| MIDI | Musical Instrument Digital Interface |
| MP@ML | Main Profile at Main Level |
| OOB | Out of Band |
| PCI | Peripheral Component Interconnect |
| PCM | Pulse Coded Modulation |
| PLL | Phase Locked Loop |
| QPSK | Quadrature Phase Shift Keying |
| QPSKQAM | QPSK Quadrature Amplitude Modulation |
| RTC | Real Time Clock |
| SLIC | Serial Line Internet Connection |
| UART | Universal Asynchronous Receiver-Transmitter |
| VBI | Vertical Blanking Interval |
| VIF/SIF | Video Intermediate Frequency/ Sound Intermediate Frequency |

With reference to FIGS. 4A, 4B and 4C, in the present embodiment, front-end block 310 receives a scrambled digital broadcast signal (e.g., digital broadcast signal 370 of FIGS. 3A and 3B) from a digital broadcaster via in-band tuner 401, OOB tuner 402 and/or MCNS FAT tuner 403. Smart card 325 includes a key to descramble the digital broadcast signal. It is appreciated that FIG. 4 shows, in a combined form, both of the embodiments illustrated by FIGS. 3A and 3B. In the case of the embodiment illustrated by FIG. 3A, smart card 325 is inserted into conditional access block 330, and conditional access block 330 descrambles and encrypts the digital broadcast signal. In the case of the embodiment illustrated by FIG. 3B, smart card 325 is plugged into POD 320. In this latter embodiment, the descrambling and encrypting functions are performed in POD 320, and so these functions are bypassed in conditional access block 330.

Continuing with reference to FIGS. 4A, 4B and 4C, the encrypted digital signal is delivered to A/V decode block 340 via conditional access block 330. In the present embodiment of the present invention, decryption engine 345 is integrated into demultiplexer ("demux") 410, which is itself integrated into A/V decode block 340. Decryption engine 345 contains an decryption engine for decrypting digital broadcast signal 370. Decryption engine 345 is integral with A/V decode block 340 and is coupled to front-end block 310 via conditional access block 330. Decryption engine 345 decrypts an encrypted signal (e.g., digital broadcast signal 370) received by A/V decode block 340 via conditional access block 330. The in-the-clear signal is immediately transmitted within the integrated circuit of A/V decode block 340 for decoding. The in-the-clear signal is never transmitted outside the physical block comprising A/V decode block 340 and decryption engine 345. In the present embodiment, decryption engine 345 provides the interface between A/V decode block 340 and conditional access block 330. It is appreciated that in other embodiments integrated circuit 345 may be integrated into A/V decode block 340 in some different manner (that is, in a location other than demux 410) while still providing the interface with conditional access block 330.

As explained above, in accordance with the present invention, there is not a point for intercepting an in-the-clear signal (e.g., a decrypted and descrambled signal) between conditional access block 330 and decryption engine 345, nor between decryption engine 345 and A/V decode block 340. Therefore, the present invention provides a secure interface between conditional access block 330 and decryption engine 345 and between decryption engine 345 and A/V decode block 340, and thus between front-end block 310 and A/V decode block 340.

Continuing with reference to FIGS. 4A, 4B and 4C, in the present embodiment, A/V decode block 340 includes an MPEG decoder (e.g., MP@ML DEC block 411) and an audio decoder (e.g., AC-3 block 412) to decode the video and audio content of digital broadcast signal 370. Graphics block 350 processes the audio and video information received from A/V decode block 340. Central processing unit 360 contains a processor (e.g., CPU core 430) and memory (e.g., instruction cache 420) for processing information and instructions used by intelligent transceiver 400.

Figure 5:
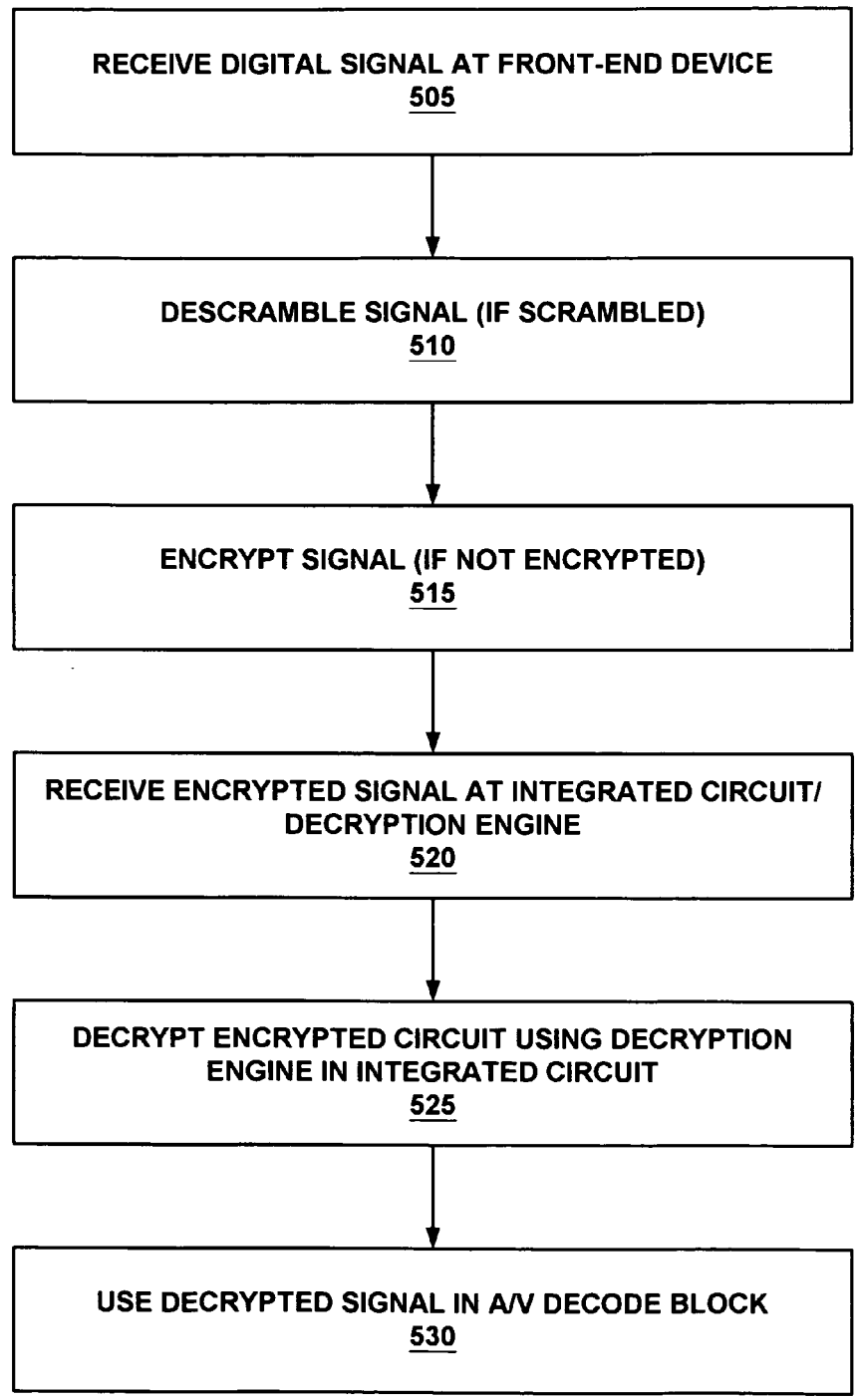
FIG. 5 is a flowchart of the steps in a process for providing a secure path for a data signal in accordance with one embodiment of the present invention.

FIG. 5 is a flowchart of the steps in a process 500 for providing a secure interface for a data signal in accordance with one embodiment of the present invention. With reference also to FIGS. 4A, 4B and 4C, in the present embodiment, process 500 is implemented as program instructions that are stored in memory (e.g., instruction cache 420) and executed by a processor (e.g., CPU core 430) of intelligent transceiver 400. It is appreciated that process 500 may be utilized in other types of devices, including consumer electronic devices, where it may be necessary to decrypt and encrypt a digital signal.

In step 505 of FIG. 5, with reference also to FIGS. 3A and 3B, a digital broadcast signal (e.g., digital broadcast signal 370) is received by intelligent transceiver 300. In the present embodiment, digital broadcast signal 370 is received by front-end block 310. Typically, digital broadcast signal 370 is scrambled but not encrypted when it is received by intelligent transceiver 300.

In step 510, in the present embodiment, digital broadcast signal 370 is sent from front-end block 310 to a first functional block, where the signal is descrambled. In the embodiment of FIG. 3A, digital broadcast signal 370 is sent from front-end block 310 to conditional access block 330. In the embodiment of FIG. 3B, digital broadcast signal 370 is sent from front-end block 310 to POD 320. Depending on the embodiment, a smart card (e.g., smart card 325) is coupled to conditional access block 330 or POD 320. Smart card 325 contains a key that is used to descramble digital broadcast signal 370.

In step 515, in the present embodiment, digital broadcast signal 370 is encrypted. In the embodiment of FIG. 3A, conditional access block 330 contains an encryption engine that is used to encrypt digital broadcast signal 370. In the embodiment of FIG. 3B, POD 320 contains an encryption engine that is used to encrypt digital broadcast signal 370. In one embodiment, the encryption engine uses a well-known DES ECB encryption routine and a key length of 56 bits. However, it is appreciated that other encryption routines and different key lengths may be used in accordance with the present invention.

In step 520 of FIG. 5, in the present embodiment, digital broadcast signal 370 (now descrambled and encrypted) is sent from the first functional block (e.g., either conditional access block 330 of FIG. 3A or POD 320 of FIG. 3B) to decryption engine 345 (FIGS. 3A and 3B), which is integral with a second functional block (e.g., A/V decode block 340 of FIGS. 3A and 3B). In the embodiment of FIG. 3B, digital broadcast signal 370 is sent from POD 320 to decryption engine 345 via conditional access block 330. In each of the embodiments of FIGS. 3A and 3B, the link between conditional access block 330 and decryption engine 345 is separate from bus 305; that is, there is a direct connection between conditional access block 330 and decryption engine 345 that bypasses bus 305.

In step 525 of FIG. 5, decryption engine 345 of A/V decode block 340 decrypts digital broadcast signal 370. The output of decryption engine 345 is a decrypted digital signal that is in the clear (e.g., a decrypted and descrambled signal). The signal in the clear is transmitted within A/V decode block 340 for decoding. The signal in the clear is never transmitted outside the physical block comprising A/V decode block 340 and decryption engine 345. Thus, there is not a point for intercepting a signal that is in the clear between conditional access block 330 and decryption engine 345, nor is there a point between decryption engine 345 and A/V decode block 340 where an in-the-clear signal can be externally accessed and intercepted.

In step 530, digital broadcast signal 370 (now decrypted and descrambled) is processed by A/V decode block 340. In the present embodiment, an MPEG (Moving Pictures Experts Group) video decoder and an AC3 (Digital Dolby) audio decoder are used; however, it is appreciated that other video or audio decoders can be used in accordance with the present invention. The output of A/V decode block 340, is provided to graphics block 350, where additional processing of the audio and video information is performed so that it can be displayed and/or listened to on a television set, computer system, or the like.

In summary, the present invention provides an apparatus and method thereof for providing a secure path for a digital signal (e.g., digital broadcast signal 370) in, for example, an intelligent transceiver (e.g., intelligent transceiver 300 of FIGS. 3A and 3B) such as a bi-directional set-top box (e.g., intelligent transceiver 400 of FIGS. 4A, 4B and 4C). Because decryption engine 345 is integral with A/V decode block 340 and coupled to front-end block 310 via conditional access block 330, there is not a point for intercepting a signal that is in the clear between either front-end block 310 or conditional access block 330 and decryption engine 345. In addition, because decryption engine 345 is physically integrated with A/V decode block 340, there is not a point for externally accessing and intercepting a signal that is in the clear between decryption engine 345 and A/V decode block 340. Therefore, the present invention provides a secure interface between conditional access block 330 and decryption engine 345 and between decryption engine 345 and A/V decode block 340, and thus between front-end block 310 and A/V decode block 340. As such, the present invention can prevent pirating of a descrambled and decrypted digital signal.

The preferred embodiment of the present invention, secure conditional access port interface, is thus described. While the present invention has been described in particular embodiments, it should be appreciated that the present invention should not be construed as limited by such embodiments, but rather construed according to the below claims.

What is claimed is:
1. A set-top box comprising:
   a bus;
   a first connection, a second connection and a third connection separate from said bus;
   a front-end device coupled to said bus and comprising a first tuner adapted to receive broadcast digital signals comprising audio and video content;

a point of deployment (POD) coupled to said front-end device and adapted to receive a smart card, said smart card plugged into said POD;
a first functional block coupled to said bus and also directly connected to said front-end device via said first connection, said first functional block adapted to descramble said digital signals if said digital signals are scrambled and to encrypt said digital signals if said digital signals are unencrypted;
an integrated circuit device coupled to said bus and also directly connected to said first functional block via said second connection, said integrated circuit device comprising a second functional block and a decryption engine integrated therein, wherein said digital signals from said front-end device are received by said decryption engine only via said first connection, said first functional block and said second connection;
wherein said decryption engine is configured to decrypt said digital signals received by said integrated circuit device and supply decrypted digital signals to said second functional block, wherein there are no points between said front-end device and said first functional block nor between said first functional block and said second functional block at which said digital signals are both descrambled and unencrypted; and
a third functional block coupled to said bus and also directly connected to said integrated circuit via said third connection, said third functional block adapted for graphics processing of said digital signals received from said integrated circuit device only via said third connection.

2. The set-top box of claim 1 further comprising:
a processor coupled to said functional blocks; and
a memory unit coupled to said processor.

3. The set-top box of claim 2 wherein said front-end device further comprises a second tuner for receiving a digital signal via a cable modem.

4. The set-top box of claim 1 wherein said second functional block comprises:
a first decoder for decoding audio content contained in said digital signals; and
a second decoder for decoding video content contained in said digital signals.

5. The set-top box of claim 4 wherein said audio content is substantially compliant with a version of the AC3 format.

6. The set-top box of claim 4 wherein said video content is substantially compliant with a version of the MPEG (Moving Pictures Experts Group) format.

7. The set-top box of claim 1 wherein said digital signals are encrypted using an encryption routine substantially compliant with DES ECB (Data Encryption Standard Electronic Code Book).

8. The set-top box of claim 1 wherein said second functional block also receives video and audio analog signals.

9. The set-top box of claim 1 wherein said third functional block also receives audio and video analog inputs.

10. A set-top box comprising:
a bus;
a first connection, a second connection and a third connection separate from said bus;
a modular front-end block coupled to said bus, said modular front-end block comprising:
a first tuner adapted to receive digital signals from a digital broadcast system; and
a second tuner for receiving digital signals via the Internet, said digital signals from said digital broadcast system and from the Internet comprising audio and video content;
a modular conditional access block coupled to said bus and adapted to receive a smart card, said smart card inserted into said modular conditional access block, said modular conditional access block also directly connected to said modular front-end block using said first connection, said modular conditional access block adapted to descramble digital signals from said digital broadcast system and from the Internet if said digital signals are scrambled and to encrypt said digital signals if said digital signals are unencrypted;
a modular decode block coupled to said bus, said modular decode block also directly connected to said modular conditional access block using said second connection, said modular decode block comprising an integrated circuit device coupled to said modular front-end block via said modular conditional access block, said integrated circuit device adapted to receive encrypted digital signals from said modular conditional access block, said integrated circuit device comprising a functional block and a decryption engine integrated therein, wherein said decryption engine is for decrypting said encrypted digital signals and wherein said functional block is for decoding audio and video content contained in said digital signals, wherein there are no points between said modular front-end block and said modular conditional access block nor between said modular conditional access block and said modular decode block at which said digital signals are both descrambled and unencrypted;
a modular graphics processing block coupled to said bus, said modular graphics processing block also directly connected to said modular decode block using said third connection, said modular graphics processing block adapted for graphics processing of digital signals received from said integrated circuit device; and
a modular central processing unit coupled to said bus, wherein said modular front-end block, said modular conditional access block, said modular decode block, said modular graphics processing block and said modular central processing unit communicate instructions via said bus and wherein said digital signals are communicated from said modular front-end block to said modular graphics processing block outside of said bus via only said first, second and third connections.

11. The set-top box of claim 10 wherein said audio content is substantially compliant with a version of the AC3 format.

12. The set-top box of claim 10 wherein said video content is substantially compliant with a version of the MPEG (Moving Pictures Experts Group) format.

13. The set-top box of claim 10 wherein said encrypted digital signals are encrypted using an encryption routine substantially compliant with DES ECB (Data Encryption Standard Electronic Code Book).

14. A method for providing a secure path for a digital signal in an intelligent transceiver, said method comprising:
receiving broadcast digital signals comprising audio and video content at a front-end device coupled to a bus, said bus for communicating addresses and data other than said digital signals;

sending said digital signals from said front-end device to a first functional block only over a direct first connection separate from said bus, said first functional block for descrambling said digital signals if said digital signals are scrambled and for encrypting said digital signals if said digital signals are unencrypted;

sending said digital signals from said first functional block to a second functional block only over a direct second connection separate from said bus, said second functional block having a decryption engine integrated therein for decrypting said digital signals, wherein said digital signals are delivered from said front-end device to said decryption engine only via said first connection, said first functional block and said second connection; and sending said digital signals from said second functional block to a third functional block only over a direct third connection separate from said bus, said third functional block for graphics processing of said digital signals.

* * * * *